(12) United States Patent
Bailey

(10) Patent No.: US 7,007,732 B2
(45) Date of Patent: Mar. 7, 2006

(54) DEFLATED TIRE LUBRICANT

(75) Inventor: Rodney R. Bailey, Simpsonville, SC (US)

(73) Assignee: Michelin Recherche et Technique S.A., Granges-Paccot (CH)

(*) Notice: Subject to any disclaimer, the term of this patent is extended or adjusted under 35 U.S.C. 154(b) by 120 days.

(21) Appl. No.: 10/426,772

(22) Filed: Apr. 30, 2003

(65) Prior Publication Data
US 2003/0226628 A1    Dec. 11, 2003

Related U.S. Application Data

(60) Provisional application No. 60/376,600, filed on Apr. 30, 2002.

(51) Int. Cl.
*B60C 17/00* (2006.01)
*B60C 17/04* (2006.01)
*B60C 17/10* (2006.01)

(52) U.S. Cl. .................... 152/516; 152/158; 152/520; 152/521

(58) Field of Classification Search ............... 152/502, 152/503, 504, 158, 518, 520, 521
See application file for complete search history.

(56) References Cited

U.S. PATENT DOCUMENTS 4,641,670 A * 2/1987 Poque et al. ............... 152/158
5,350,531 A * 9/1994 Musilli ....................... 508/523

* cited by examiner

*Primary Examiner*—Blaine Copenheaver
*Assistant Examiner*—Justin Fischer
(74) *Attorney, Agent, or Firm*—E. Martin Remick; Adam Arnold; Frank J. Campigotto

(57) ABSTRACT

The present invention is a pneumatic tire and wheel assembly capable of being run in a deflated condition comprising a wheel having a wheel rim, a pneumatic tire mounted on the rim, where the pneumatic tire has an interior cavity, an annular insert mounted on the wheel rim and inside the interior cavity of the tire, and a lubricant comprising a substance selected from the group consisting of stearic acid, sodium oleate, sodium palmitate, polyethylene wax, polypropylene wax, and mixtures thereof, and a substance selected from the group consisting of paraffin oil, corn oil, sunflower oil, olive oil, rapseed oil, tricresyl phosphate and naphthalenic oil and mixtures thereof. When the assembly is used with the tire in deflated condition, the normally solid lubricant liquefies, and thereby facilitates relative movement of the interior surface of the tire contacting the annular insert and the annular insert. In one embodiment of the invention, the insert comprises rubber or polyurethane.

2 Claims, 1 Drawing Sheet

DEFLATED TIRE LUBRICANT

This application is a provisional of 60/376,600 filed Apr. 30, 2002.

FIELD OF THE INVENTION

The present invention is in the field of pneumatic tires, and more specifically relates to pneumatic tires having a supporting device for bearing the load when the tire is deflated.

BACKGROUND OF THE INVENTION

Upon partial or complete deflation of a pneumatic tire, the interior surface of the tire may come into contact with the wheel, generating considerable heat that may degrade the structure of the tire. One approach to this problem has been to provide an annular insert. This annular insert, or support ring, may be a solid ring that supports the load of the wheel assembly upon deflation of the tire. However, this insert may also chafe the interior surface of the tire upon deflation, or even upon normal operation of the tire. Therefore, it has been proposed to lubricate the outer surface of the annular insert or the inner surface of the tire. However, there is a need for a tire and wheel assembly with an annular insert having an improved lubricant.

SUMMARY OF THE INVENTION

The present invention is a pneumatic tire and wheel assembly capable of being run in a deflated condition comprising a wheel having a wheel rim, a pneumatic tire mounted on the rim, where the pneumatic tire has an interior cavity, an annular insert mounted on the wheel rim and inside the interior cavity of the tire, and a thermal phase-change lubricant comprising a substance selected from the group consisting of stearic acid, sodium oleate, sodium palmitate, polyethylene wax, polypropylene wax, and mixtures thereof, and a substance selected from the group consisting of paraffin oil, corn oil, sunflower oil, olive oil, rapseed oil, tricresyl phosphate and naphthalenic oil, and mixtures thereof.

When the assembly is used with the tire in deflated condition, the normally solid lubricant changes to a liquid phase and thereby facilitates relative movement of the interior surface of the tire contacting the annular insert and the annular insert. In one embodiment of the invention, the insert comprises rubber or polyurethane.

DETAILED DESCRIPTION OF THE INVENTION

Figure 1:
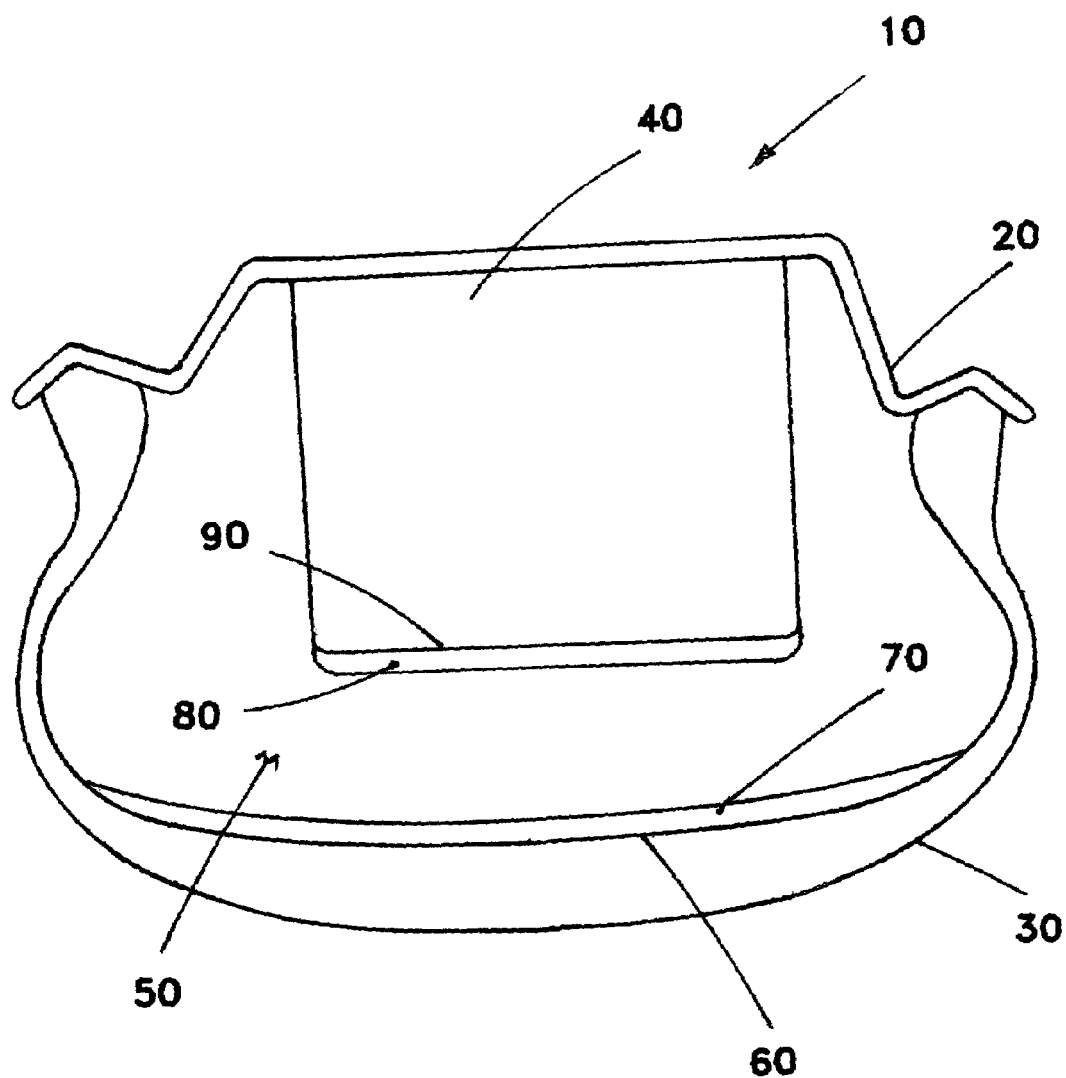
FIG. 1 illustrates a tire and wheel assembly according to the invention.

The present invention is a pneumatic tire and wheel assembly capable of being run in a deflated condition comprising a wheel having a wheel rim, a pneumatic tire mounted on the rim, where the pneumatic tire has an interior cavity, an annular insert mounted on the wheel rim and inside the interior cavity of the tire, and a thermal phase-change lubricant comprising a substance selected from the group consisting of stearic acid, sodium oleate, sodium palmitate, polyethylene wax, polypropylene wax, and mixtures thereof, and a substance selected from the group consisting of paraffin oil, corn oil, sunflower oil, olive oil, rapseed oil, tricresyl phosphate and naphthalenic oil, and mixtures thereof.

When the assembly is used with the tire in deflated condition, the normally solid lubricant liquefies and thereby facilitates relative movement of the interior surface of the tire contacting the annular insert and the annular insert.

The lubricant of the present invention does not flow at normal tire operating temperatures, and therefore does not adversely affect normal tire operations. Since the lubricant is normally a solid, it presents less opportunity for bead contamination, and less opportunity to penetrate the inner liner of the tire to the carcass of the tire. In addition, since it is dimensionally stable, its presence in the tire does not present a challenge to proper tire balance. Furthermore, the tire with dry lubricant is more convenient to mount, ship, and store.

In the event of tire deflation, the lubricant is liquefied by the increased heat generated by friction of the insert on the interior of the tire and the increased deflection of the tire.

The liquefaction temperature of the coating can be adjusted by changing the concentration and melting point of the solid components. In one embodiment of the invention, the lubricant does not liquefy until it has reached a temperature between approximately 100 to 130 degrees Centigrade.

The coating can be prepared by adding the liquid component or components to the liquefied solid component or components and allowing the mixture to harden to a solid. Solid components with different melting points can be mixed with different liquid components to achieve coatings with different melting points. Sodium oleate melts at approximately 232–235° C.; sodium palmitate at 270° C.; stearic acid at 70° C.; polyethylene wax (softens) at about 130° C.; polypropylene wax (softens) at about 160° C.

The insert may be made of a variety of elastomeric materials In one embodiment of the invention, the insert comprises rubber or polyurethane.

In one embodiment of the invention, the ratio of paraffin oil to stearic acid is between approximately 1:1 and 4:3 by weight. In another embodiment of the invention, the ratio of naphthalenic oil to polyethylene wax is approximately 5:3 by weight.

Included also in the lubricant may be antioxidants and anti-bactericidal agents.

FIG. 1 is an illustration of the tire and wheel assembly of the present invention. The wheel and tire assembly (10) includes a tire (30) mounted on a rim (20). Secured to the rim (20) in the interior (50) of the tire (30) is an annular insert (40), which would support the applied load in the event of tire deflation. Lubricant (90) may coat the radially outermost surface (90) of the annular insert (40), or lubricant (70) may coat the interior surface (60) of the tire (30). In one embodiment, both surfaces may be coated with the same lubricant, or different lubricants. For example, lubricant (70) may have optimized adherence to the tire inner liner, typically composed of butyl rubber. In one embodiment, lubricant (80) may have better adherence to polyurethane than lubricant (70), which may adhere more strongly to the inner liner, which is typically butyl rubber.

Variations and modifications of the present invention will be clear to one of skill in the art after reviewing the foregoing specification and drawing. These variations and modifications are meant to fall within the scope of the appended claims.

I claim:

1. A pneumatic tire and wheel assembly capable of being run in a deflated condition comprising:
   (a) a wheel having a wheel rim;
   (b) a pneumatic tire mounted on the rim, wherein the pneumatic tire has an interior cavity;
   (c) an annular insert mounted on the wheel rim and inside the interior cavity of the tire;
   (d) a lubricant comprising a mixture of stearic acid, and paraffin oil, wherein the ratio of paraffin oil to stearic acid is between approximately 1:1 and 4:3 by weight;

wherein, when the assembly is used with the tire in deflated condition, the lubricant will facilitate relative movement of the interior surface of the tire contacting the annular insert and the annular insert.

2. The assembly of claim 1, wherein the annular insert comprises a substance selected from the group consisting of natural rubber and polyurethane.

* * * * *